(12) United States Patent  
Scharf

(10) Patent No.: US 10,580,044 B2  
(45) Date of Patent: Mar. 3, 2020

(54) IDENTIFYING OPTIMAL VIEWABILITY FOR CONTENT

(71) Applicant: ADOBE INC., San Jose, CA (US)

(72) Inventor: Matthew Ryan Scharf, San Francisco, CA (US)

(73) Assignee: ADOBE INC., San Jose, CA (US)

( * ) Notice: Subject to any disclaimer, the term of this patent is extended or adjusted under 35 U.S.C. 154(b) by 707 days.

(21) Appl. No.: 15/190,932

(22) Filed: Jun. 23, 2016

(65) Prior Publication Data

US 2017/0372376 A1    Dec. 28, 2017

(51) Int. Cl.
*G06Q 30/00* (2012.01)
*G06Q 30/02* (2012.01)

(52) U.S. Cl.
CPC ............. *G06Q 30/0273* (2013.01)

(58) Field of Classification Search
CPC ..................... G06Q 30/0207–0284
USPC ............................ 705/14.1–14.73
See application file for complete search history.

(56) References Cited

U.S. PATENT DOCUMENTS

| | | | | |
|---|---|---|---|---|
| 2002/0188508 A1* | 12/2002 | Lee | ............. | G06Q 30/02 705/14.53 |
| 2010/0287580 A1* | 11/2010 | Harding | ............. | G06Q 30/0255 382/100 |
| 2012/0130805 A1* | 5/2012 | On | ............. | G06Q 30/0251 705/14.49 |
| 2015/0287097 A1* | 10/2015 | Umeda | ............. | G06Q 30/0275 705/14.71 |
| 2017/0093650 A1* | 3/2017 | Predovic | ............. | H04L 67/22 |

* cited by examiner

*Primary Examiner* — John Van Bramer

(74) *Attorney, Agent, or Firm* — Shook, Hardy & Bacon LLP

(57) ABSTRACT

Systems and methods provide for determining optimal viewability ranges for content impressions. During content impressions, a content server receives content requests via an ad tag that is enhanced with a content impression identifier or cost data from a bidding platform. The content server serves a pixel tag with content in order to collect viewability data for each content impression. The content server stores the viewability data with the content impression identifier or cost data from the bidding platform for each content impression. This allows for the correlation of cost data and viewability data on a per-content impression basis. The cost data and viewability data are used to compute cost-per-conversion information for each of a number of different viewability ranges.

20 Claims, 9 Drawing Sheets

| VIEWABILITY % 302 | CONVERSION RATE RANK 304 | COST RANK 306 | COST-PER-CONVERSION 308 |
|---|---|---|---|
| 0 | 4 | 1 | - |
| 0-9 | 5 | 2 | - |
| 10-19 | 7 | 3 | - |
| 20-29 | 4 | 4 | - |
| 30-39 | 5 | 5 | $70.00 |
| 40-49 | 1 | 6 | $49.00 |
| 50-59 | 2 | 7 | $60.00 |
| 60-69 | 3 | 8 | $55.00 |
| 70-79 | 6 | 9 | $90.00 |
| 80-89 | 8 | 10 | - |
| 90-99 | 9 | 11 | - |
| 100 | 10 | 12 | - |

*FIG. 3.*

IDENTIFYING OPTIMAL VIEWABILITY FOR CONTENT

BACKGROUND

A variety of different digital spaces can serve as locations for displaying digital marketing content (e.g., advertisements). For instance, marketing content can be placed at different locations on web pages, within search results, within a game, within a mobile app, or within a productivity application, to name a few. However, not all digital marketing locations are created equal. Some locations provide space at which marketing content is highly viewable by users. For instance, the top of a web page is typically a location that has high viewability by users since it is initially displayed when the web page is rendered on user devices. Other locations, however, provide space at which marketing content is rarely seen. For instance, the bottom of a web page can have low viewability by users since the bottom of the web page is initially off-screen and users may not scroll down to view the bottom of the web page.

Marketers typically try to increase the likelihood of their marketing content being rendered in the viewable space on user devices so the marketing content has the opportunity to make an impact on their addressable audience. Currently, there are mechanisms in place to allow marketers to control bidding on locations to present their content based on viewability in order to optimize toward and increase bidding on locations that are deemed to be in view or with high likelihood of being viewable. One challenge, though, is that the programmatic nature of bidding operates on a supply and demand basis. As viewable locations are considered to be of higher value by more and more marketers, this drives up the demand for these locations. Meanwhile, the supply of the viewable locations stays relatively flat or even declines as viewability increases. As a result, the price of viewable locations goes up (and could go up exponentially). This presents a challenge for marketers to determine at what level of viewability is the cost too high to present their content at those locations.

SUMMARY

Embodiments of the present invention relate to, among other things, identifying optimal viewability ranges for content impressions. In accordance with some embodiments, a content server receives content requests for content impressions via ad tags launched on user devices. Each content request includes a content impression identifier or cost data from a bidding platform. The content server provides content with pixel tags to the user devices. In response to the pixel tags being launched on the user devices during the content impressions, the content server receives viewability data for each content impression. The viewability data for each content impression includes a time value for each of a number of predefined viewability ranges. The viewability data for each content impression is stored in association with the content impression identifier or cost data for each content impression. This allows for cost data from the bidding platform to be correlated with the viewability data for each content impression. Content impressions are assigned to groupings corresponding to viewability ranges based on the viewability data for each content impression. Additionally, a cost-per-conversion is computed for each grouping using the cost data and conversion data for content impressions assigned to each grouping. A user interface is provided for display that includes information regarding the cost-per-conversion for different viewability ranges.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIGS. 2-4 are exemplary user interfaces for presenting cost-per-conversion data for different viewability ranges in accordance with some implementations of the present disclosure;

DETAILED DESCRIPTION

Figure 1A:
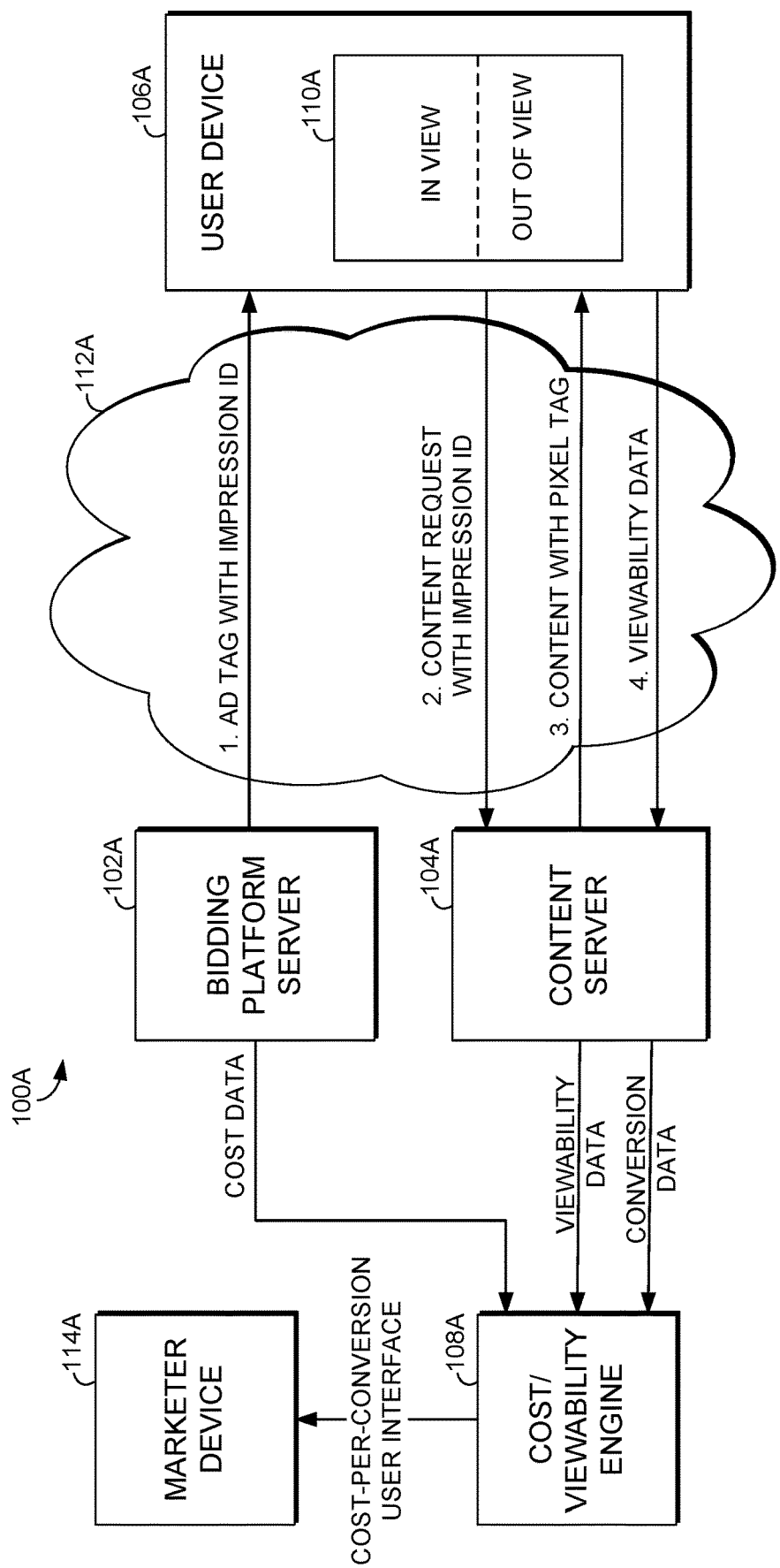
FIGS. 1A and 1B are block diagrams illustrating exemplary systems in accordance with some implementations of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various terms are used throughout this description. Definitions of some terms are included below to provide a clearer understanding of the ideas disclosed herein:

The term "content impression" is used herein to refer to delivery of content for display on a user device. Content can be delivered for display within any of a number of different environments within the scope of embodiments herein. For instance, content can be delivered for display: on a webpage, within search results, within a game, within a mobile app, or within a productivity application (e.g., a word processor application), to name a few.

The term "bidding platform" refers to a system on one or more servers that, among other things, controls a marketer's automatic bidding on offers for content impressions on an open exchange. Generally, when an opportunity for a content impression becomes available on a user device, a bidding process occurs in which multiple marketers bid to have their content delivered for the content impression. Offers for the content impression are provided to bidding platforms, which dynamically bid on the content impression. When a bidding platform wins a content impression, the bidding platform issues an ad tag, which is used to request content from a content server. A bidding platform may be, for instance, a demand-side platform that bids dynamic costs for different content impressions. Additionally, a bidding platform may be one that bids on content impressions only using a flat rate cost for content impressions. Measuring viewability across non-open exchange inventory can also be provided in some configurations by including information from content impression purchases directly with single web domain entities or directly with networks owning inventory across multiple domains. As a result, the cost accrual in these instances may not be dynamic like they are on the open exchange.

The term "ad tag" refers to HTML code that is provided to a user device for a content impression and acts as a redirect to cause the user device to request content from a content server for the content impression.

The term "viewability" represents a percentage of content that is displayed on a user device. For example, if the top half of content is displayed on a user device (with the bottom half being off screen), the content would have a viewability of 50 percent.

The term "pixel tag" refers to code that is triggered when associated content is displayed on a user device in order to collect impression data. A pixel tag sets forth various attributes and causes the collection of values for the attributes to provide the impression data. The attributes specified by a pixel tag include viewability attributes. Each viewability attribute corresponds with a range of viewability (e.g., 0-9 percent, 10-19 percent, 20-29 percent, etc.). A viewability attribute may specify collection of a value corresponding to either: (1) a length of time the content is displayed in a particular viewability range; or (2) whether the content is displayed in a particular viewability range for a threshold period of time set forth by the viewability attribute (e.g., one second). A pixel tag may specify a number of attributes beyond viewability attributes, such as metadata classifying: an advertising campaign identifier; information identifying a location (e.g., webpage) at which the content was delivered; a content identifier; location of user/user device; time of content impression, targeting information for content impression being sent to user; and content dimensions.

The term "impression data" refers to data collected about a content impression via a pixel tag. In accordance with embodiments described herein, the impression data includes a unique user identifier (UUID) and a value for each attribute specified by the pixel tag. As is known in the art, UUIDs can be used to anonymously track unique users or user devices. For instance, a cookie can be used to track or map to a UUID. A UUID in relation to the technology described herein represents a unique identifier for a person or device, frequently and generically referred to as a userid, which is a unique identifier generated in order to have a persistent identifier for a person or device.

The term "viewability data" is used herein to refer to the portion of impression data corresponding to viewability attributes specified by a pixel tag. The viewability data includes a value for each viewability attribute corresponding to a different range of viewability. In some configurations, the value collected for a viewability attribute is a length of time the content was displayed within the corresponding viewability range. For instance, one piece of viewability data could indicate that 40-49 percent of the content was viewable on the user device for 0.5 seconds. In other words, the viewability data captured is done so in the form of key-value pairs. The key is the viewability range and the value is the duration in seconds that the content was in the viewable space of the end user's screen. In other configurations, viewability attributes may specify a threshold length of time (e.g., one second), and the value collected for a viewability attribute is whether the content was displayed within the corresponding viewability range for the threshold length of time. For instance, one piece of viewability data could indicate whether 40-49 percent of the content was viewable for a threshold length of time of at least one second.

Traditional approaches to optimize the placement of marketing content with viewability in mind have been done at a level far too high to yield actionable insight and the methods have been far too arbitrary. Generally, marketers focus on only one side of the problem—the impression inventory side. Marketers are looking to increase the quality (viewability) of their content impressions. However, marketers aren't taking into consideration the different levels of what viewability could mean and the associated conversion of users exposed to the different levels of viewability—the attribution side.

Marketers currently require their media partners serving content to serve a certain percentage of content impressions "within view." However, the definition of what is "within view" is typically arbitrarily set. Some marketers use the Interactive Advertising Bureau (IAB) definition of a viewable impression, which requires at least 50 percent of the content to be in the viewable space on a user device for at least one second. Using this IAB definition is a problem because partially viewed content (e.g., less than 50 percent of the content and/or for less than one second) could and likely does indeed have some value. Regardless of using the standard IAB definition or an alternatively-defined custom definition (e.g., 60 percent for at least two seconds), without bringing in the cost to win each content impression along with the viewability range of those content impressions, marketers are not certain whether their viewability requirement is optimal. It could be too stringent or too soft depending on how costly those content impressions are to win on the open exchange and how impactful those content impressions are at resulting in a subsequent conversion. As an example to illustrate, if a marketer has chosen a definition of viewability as being 100 percent of content being viewable for at least one second, then the marketer might be paying far too much to win 100 percent viewable content impressions when the cost to win content impressions at a less stringent definition of viewability would actually drive a more efficient cost-per-conversion because they could be operating lower on the cost curve while achieving equivalent conversion rates. Alternatively, if a marketer has a viewability definition of 50 percent of content for at least one second, the marketer might be missing out on a higher possible conversion rate from optimizing towards 65 percent viewability because the incremental cost to win content impressions at the higher 65 percent viewability requirement could be offset by a disproportionately higher conversion rate.

Embodiments of the present invention address the technical challenge of optimizing programmatic delivery of content to viewable locations by providing an approach that facilitates identifying optimal viewability for content from cost and conversion perspectives. Generally, some aspects of the technology described correlate cost data from a bidding platform with viewability data from a content server on a per-content impression basis. The cost data and viewability data are then used to derive cost-per-conversion information for different viewability ranges (and different cost ranges in some configurations).

More particularly, when a bidding platform wins content impressions on user devices, the bidding platform sends the user devices an ad tag that includes code that is used by the user devices to request content from a content server. In accordance with embodiments herein, each ad tag is enhanced with information from the bidding platform to allow for cost data from the bidding platform to be correlated with viewability data from the content server. In some embodiments, the ad tag is enhanced with a content impression identifier used by the bidding platform for the content impression. In other embodiments, the ad tag is enhanced with cost data for the content impression.

When an ad tag is launched by the bidding platform for a content impression to be served on a user device, it causes a content request to be sent to the content server. The bidding platform passes data into the ad tag to enhance the data typically captured by the ad tag. The content request code includes placeholders in the ad tag script designed to capture the enhanced information (i.e., the content impression identifier or cost data for the content impression from the bidding platform). In response to the content request, the content server stores the content impression identifier or cost data from the data-side platform in a content impression record for the content impression. Additionally, the content server provides content with a pixel tag to the user device. The pixel tag comprises code that is launched when the content is rendered on the user device in order to collect impression data for the content impression. The pixel tag sets forth viewability attributes for collecting viewability data. Each viewability attribute corresponds with a different viewability range. The pixel tag may also set forth other types of attributes for collecting additional impression data for the content impression.

When a pixel tag is launched on a user device, impression data is collected and returned to the content server and stored in the content impression record for the content impression. The impression data includes a value for each attribute set forth by the pixel tag. This includes viewability data, which comprises time values based on a length of time content was displayed on the user device within each viewability range. For instance, the viewability data for a given content impression could indicate that 0-9 percent of the content was displayed for 0.5 seconds, 10-19 percent of the content was displayed for 1.2 seconds, 20-29 percent of the content was displayed for 0.6 seconds, etc. Alternatively, the viewability data can indicate whether the content was displayed within each viewability range for a threshold period of time (e.g., one second).

In this manner, cost data from the bidding platform is correlated with viewability data from the content server for each content impression. In particular, in embodiments in which the ad tag is enhanced with a content impression identifier from the bidding platform, the content impression identifier is associated with the viewability data on the content server and used to correlate the viewability data with the cost data on the bidding platform. In embodiments in which the ad tag is enhanced with cost data, the cost data and viewability data are correlated in a content impression record for the content impression on the content server. The cost data and viewability data for content impressions are used to derive a cost-per-conversion for each viewability range. More particularly, content impressions are placed in groupings corresponding to different viewability ranges based on viewability data for the content impressions. In some embodiments, the groupings also correspond to different cost ranges based on the cost of content impressions (i.e., each grouping corresponds to a combination of a viewability range and a cost range). The cost-per-conversion for a given grouping is determined based a total cost for content impressions for the grouping and the number of those content impressions that resulted in a conversion. Various user interfaces can be generated that provide information regarding the cost-per-conversion for the different viewability ranges.

Typically, dynamic cost data is used. However, in situations when dynamic cost is not available, a flat rate cost can be used or an assumed range of cost values can be used to plot out assumed content impression costs to determine thresholds to act as ceilings that a marketer is willing to pay for content impressions due to inefficiencies developing beyond certain thresholds depending on the conversion rates by viewability range.

Among other things, the technology described herein solves a technical challenge in that viewability data and corresponding cost data needs to be correlated on a per-content impression basis. Traditionally, any information regarding viewability is not at the individual content impression level and the typical recording of impression costs are rolled up into a more easily digestible metric called eCPM (effective CPM), which provides a cost per 1,000 content impressions. The technology described herein addresses the technical challenge of correlating viewability data and cost data at the individual content impression level by providing techniques to correlate data from two disparate systems—namely a bidding platform and a content server.

The results of the technology described herein provide the cost-per-conversion efficiency of each permutation of viewable range and, in some configurations, also the cost to win each of those content impressions at those viewable ranges. This information can be used by marketers to identify a definition of viewability to optimize towards and also see all other permutations of viewability and associated cost to ultimately understand how the marketer's addressable audience converts at those costs and viewability combinations to identify whether the marketer should shift its definition of viewability to a more optimal point of operation.

By identifying how content impressions fall on the open exchange, a marketer's unique cost curve as it relates to viewability can be plotted, and the loss in conversions or gained conversions can be quantified that would result from shifting the marketer's viewability definition. Even though a marketer might be optimizing toward a specific viewability definition, the reality is that some content impressions end up being rendered at differing viewability levels due to uncontrollable factors such as user scrolling, etc. The technology described herein provides an advantage because it allows for the measurement of the cost and viewability of each content impression in order to gather all the data needed to analyze all levels of viewability and associated cost.

Since the cost to win each content impression is a function of other competing advertisers bidding for the same content impression at the same time and the perceived value of each content impression in the eyes of multiple different marketers that may or may not have similar products, the methodology provided by the technology described herein renders the actual data unique to a marketer based upon the going rate of all content impressions served on the open exchange. The open marketplace of programmatic content delivery allows marketers to gather actual going rates for all content impressions. Each marketer's cost and conversion data will look different. The resulting data also incorporates different levels of viewability and each marketer's content is different and therefore renders different information at different view ability ranges.

With reference now to the drawings, FIG. 1A is a block diagram illustrating an exemplary system 100A for correlating cost data from a bidding platform server 102A with viewability data from a content server 104B in order to determine cost-per-conversion information for different viewability ranges in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100A is an example of a suitable architecture for implementing certain aspects of the present disclosure. Among other components not shown, the system 100A includes a bidding platform server 102A, a content server 104A, a user device 106A, and a cost/viewability engine 108A. Each of the components shown in FIG. 1A can be provided on one or more computer devices, such as the computing device 800 of FIG. 8, discussed below. As shown in FIG. 1A, the bidding platform server 102A and the content server 104A can each communicate with the user device 106A via the network 112A, which may include, without limitation, one or more local area networks (LANs) and/or wide area networks (WANs). Such networking environments are commonplace in offices, enterprise-wide computer networks, intranets, and the Internet. It should be understood that any number of user devices and servers may be employed within the system 100A within the scope of the present invention. Each may comprise a single device or multiple devices cooperating in a distributed environment. Additionally, other components not shown may also be included within the network environment.

The system 100A is generally configured to deliver content for content impressions on user devices, such as the user device 106A and to collect and analyze cost data and viewability data for the content impressions. Generally, when an opportunity for a content impression becomes available on a user device, such as the user device 106A, a bidding process occurs in which multiple marketers bid to have their content delivered for the content impression. Such bidding is typically facilitated by an ad exchange (not shown), which puts out offers for the content impression to various bidding platforms, such as the bidding platform 108A. As is known in the art, a bidding platform is a system on one or more servers that, among other things, controls automatic bidding on offers for content impressions. As such, when each bidding platform receives an offer for the content impression on the user device 106A, the bidding platforms can automatically bid on the content impression, and the ad exchange selects a winner and informs the winning bidding platform.

In the present example in FIG. 1A, the bidding platform server 102A wins the content impression for the user device 106A. When informed by the ad exchange, the bidding platform server 102A records information regarding the content impression, including cost data regarding the cost for the content impression and a content impression identifier. The content impression identifier used by the bidding platform server 102A can include a single identifier or multiple identifiers. As an example of the latter, in some instances, the content impression identifier can include both a unique user identifier (UUID) identifying the user/user device (e.g., a cookie identifier) and an identifier for the current content impression for this UUID.

The bidding platform server 102A also provides an ad tag to the user device 106A. The ad tag is HTML code that is used by the user device 106A to request content from the content server 104A. Although FIG. 1A shows the ad tag being provided directly from the bidding platform server 102A to the user device 106A, it should be understood that the ad tag may be provided through one or more intermediaries (e.g., the ad exchange).

In accordance with embodiments herein, the ad tag is enhanced with information that allows for correlating cost data for the content impression from the bidding platform server 102A with viewability data from the content server 104A (as will be discussed in further detail below). In the system 100A of FIG. 1A, the ad tag is enhanced with the content impression identifier used by the bidding platform server 102A. By way of example to illustrate, the following is an exemplary ad tag in which the bolded portions are variable placeholders to add enhanced information from a bidding platform. The "userid" portion contains a UUID for the user/user device (e.g., a cookie ID), and the "timestamp" portion contains an identifier for the current content impression indicating when it was served to the user. Together, these values operate as a content impression identifier to uniquely identify the content impression.

---

<IMG SRC="https://ad.aaaaaaaaaaa.net/ddm/ad/N4270.149964.mediapartnerA/B9234036.125329558;sz=300x250;u={ userid___timestamp___creativeid___bidrequestid___};ord=[timestamp];dc_lat=;dc_rdid=;tag_for_child_directed_treatment=?" BORDER=0 WIDTH=300 HEIGHT=250 ALT="Advertisement"></A>

When the ad tag is received at the user device 106A, it acts as a redirect causing the user device 106A to request content from the content server 104A. The content request to the content server 104A contains information from the ad tag, including the content impression identifier used by the bidding platform. In response, the content server 104A creates a content impression record for the content impression and stores, among other things, the content impression identifier from the bidding platform server 102A included in the request that is populated from the bidding platform into the fields in the ad tag above. The content server 104A also sends content with a pixel tag to the user device 106A.

The pixel tag comprises code that is triggered when the content 110A is displayed on the user device 106A in order to collect impression data regarding the content impression on the user device 106A. The pixel tag specifies a number of attributes for collecting values for those attributes. In accordance with embodiments herein, the attributes at least include a number of viewability attributes. Each viewability attribute corresponds with a different range of viewability, which represents the percentage of content that is displayed on the user device 106A. By way of example only and not limitation, the different viewability ranges could be: 1-9 percent; 10-19 percent; 20-29 percent; 30-39 percent; 40-49 percent; 50-59 percent; 60-69 percent; 70-79 percent; 80-89 percent; 90-99 percent; and 100 percent. It should be understood that any of a variety of different viewability ranges may be employed within the scope of embodiments herein. Each viewability attribute also specifies a time component, which either indicates to capture a length of time content is displayed within the corresponding viewability range or whether the content was displayed within the corresponding viewability range for a threshold period of time (e.g., one second).

A variety of other attributes can be specified in addition to the viewability attributes. By way of example only and not limitation, the other attributes can include: an advertising campaign identifier; information identifying a location (e.g., webpage) at which the content was delivered; a content identifier; location of user/user device; time of content impression, targeting information used to decide to send content to user; and content dimensions.

When the content 110A is displayed on the user device 106A, the pixel tag is launched in order to collect impression data based on the specified attributes. As represented in FIG. 1A, a portion of the content 110A is in view while the remainder of the content 110A is out of view. The impression data collected via the pixel tag includes a UUID to uniquely identify the user/user device and a value for each attribute. This includes collecting viewability data, which captures a time value for each viewability attribute. The time value collected for each viewability attribute is either a length of time the content 110A was displayed within a corresponding viewability range (i.e., a continuous number) or an indication of whether the content 110A was displayed within a corresponding viewability range for a threshold period of time (i.e., a binary value). Techniques for collecting viewability data are known, and therefore, will not be discussed in further detail herein. Such known techniques can be employed in collecting the viewability data.

The impression data (including viewability data) captured via the pixel tag is returned to the content server 104A. While FIG. 1A shows the impression data being sent from the user device 106A to the content server 104A, it should be understood that the impression data may first be sent to another component, which then transfers the impression data to the content server 104A. The impression data is stored in the content impression record for the content impression at the content server 104A.

In this way, the content server 104A stores impression data from multiple content impressions served by the content server 104A to different user devices. Each content impression record at the content server 104A stores a content impression identifier from the bidding platform server 102A and viewability data collected using a pixel tag. By storing the content impression identifier from the bidding platform server 102A in a content impression record at the content server 104A, the viewability data at the content server 104A for the content impression can be correlated to the cost data at the bidding platform server 102A for the content impression. As used herein, a content impression record at the content server 104A includes data stored by the content server 104A for a given content impression. The data for a content impression record can be stored in one location or in multiple locations. For instance, one type of data (e.g., the viewability data) for a content impression may be stored in one table, while other data for the content impression could be stored in another table. The data in each table for the content impression could be keyed on a common UUID and/or other identifier or information (e.g., a timestamp) that allows the data to be tied together.

A cost/viewability engine 108A operates on cost data, viewability data, and conversion data to generate information regarding the cost-per-conversion for each viewability range specified by the viewability data. As shown in FIG. 1A, the cost/viewability engine 108A accesses cost data from the bidding platform server 102A. The cost data is provided on a per-content impression basis. The cost data for a given content impression provides the cost for the content impression and is associated with a corresponding content impression identifier used by the bidding platform server 102A. The cost/viewability engine 108A also accesses viewability data from the content server 104A. The viewability data is provided on a per-content impression basis. The viewability data for a given content impression identifies a time value for each of a number of viewability ranges and is associated with the content impression identifier used by the bidding platform server 102A (as obtained via the ad tag) for the content impression. The cost/viewability engine 108A further accesses conversion data, which provides information allowing for the determination of content impressions that resulted in conversions (e.g., purchasing a product).

While FIG. 1A shows the content server 104A providing the conversion data, it should be understood that conversion data may be stored and accessed from other locations. The conversion data could include UUIDs that correlate to UUIDs in content impression records at the content server 104A to allow for identification of content impressions that resulted in conversions. In some configurations, the conversion data can come from an attribution model as opposed to coming only from the content server 104A. For example, scored marginal values can be assigned by an attribution model to each content impression for the various viewability ranges. The attribution model inputs include data from the content server 104A, and the attribution model output includes the data from the content server 104A with marginal scores. This is just one example illustrating that the conversion data can come from another source beyond just the content server 104A.

The cost/viewability engine 108A assigns each content impression to one of a number of groupings. In some configurations, the groupings are based on viewability alone. In such configurations, each grouping corresponds to a particular viewability range. Each grouping used by the cost/viewability engine 108A also specifies a required time value. For instance, a grouping could specify 80-89 percent viewability with a required time value of at least one second. Accordingly, a content impression is assigned to that grouping only if the viewability data indicates that 80-89 percent of the content was displayed for at least one second. In some instances, multiple groupings could be specified with the same viewability range but different required time values. For instance, one grouping could specify 80-89 percent viewability for at least one second, while a second grouping could specify 80-89 percent viewability for less than one second.

The viewability data for a given content impression can qualify the content impression for multiple groupings. For instance, suppose the viewability data for a given content impression indicates that the content was displayed in the 70-79 percent range for a specific duration of time and also displayed in the 80-89 percent range for another or the same duration of time because the user may have scrolled to experience multiple percentages of exposure to the content. As such, the content impression qualifies for a first grouping corresponding with 70-79 percent viewability for at least one second and a second grouping corresponding with 80-89 percent viewability for at least one second. In some configurations, each content impression can be assigned to multiple groupings. As such, the content impression in this example would be assigned to both groupings. In other configurations, each content impression is assigned to only a single grouping. As such, the content impression in this example would only be assigned to one of the two groupings (e.g., the highest viewability range).

In some configurations, groupings are based on cost ranges in addition to viewability ranges. For instance, the cost ranges could be $0.01-0.99, $1.00-1.50, $1.51-2.00, etc. In such configurations, each content impression is assigned to a grouping that is combination of a viewability range and a cost range based on viewability data qualifying for a particular viewability range and cost data qualifying for a particular cost range. For instance, assume a content impression included viewability data indicating 80-89 percent viewability for over one second and cost data indicating the content impression cost $1.25. The content impression would be included in a grouping that corresponds to a combination of a viewability range of 80-89 percent viewability for at least one second and a cost range of $1.00-1.50. The cost ranges above represent typical eCPM dollar range values as examples only. eCPM values represent the average cost per 1,000 content impressions in order to view the cost in easily understood dollar value ranges. In reality, the cost for any individual content impression is far less than the ranges outlined above.

Regardless of the grouping approach, the cost/viewability engine 108A computes a cost-per-conversion for each grouping. The cost-per-conversion for a given grouping can be computed by dividing the total cost of the content impressions assigned to the grouping divided by the number of conversions from the content impressions based on the conversion data (or the total cost could be multiplied by a conversion rate). The total cost may be the actual cost (i.e., sum of the cost of the content impressions) or an estimated cost determined by multiplying the number of conversions by a cost associated with the cost range for the grouping (e.g., middle cost in the cost range).

This provides cost-per-conversion data for different viewability ranges (and cost ranges when used). In some configurations, the initially computed cost-per-conversion for each viewability range is compared against a baseline, which is the cost-per-conversion computed for a zero percent viewability range. This provides an indication of the highest lift over out-of-view impressions.

The cost-viewability engine 108A generates one or more user interfaces to present the cost-per-conversion data. The cost-per-conversion user interface(s) are provided for display on a marketer device 114A to allow a marketer to review the cost-per-conversion data. While the cost-viewability engine 108A is shown separate from other components in FIG. 1A, in some embodiments, the cost-viewability engine 108A may be provided on another component, such as the content server 104A or the marketer device 114A. Alternatively, the cost-viewability engine 108A may be provided on another device not shown in FIG. 1A, such as a server device responsible for providing cost-per-conversion data.

Figure 2:
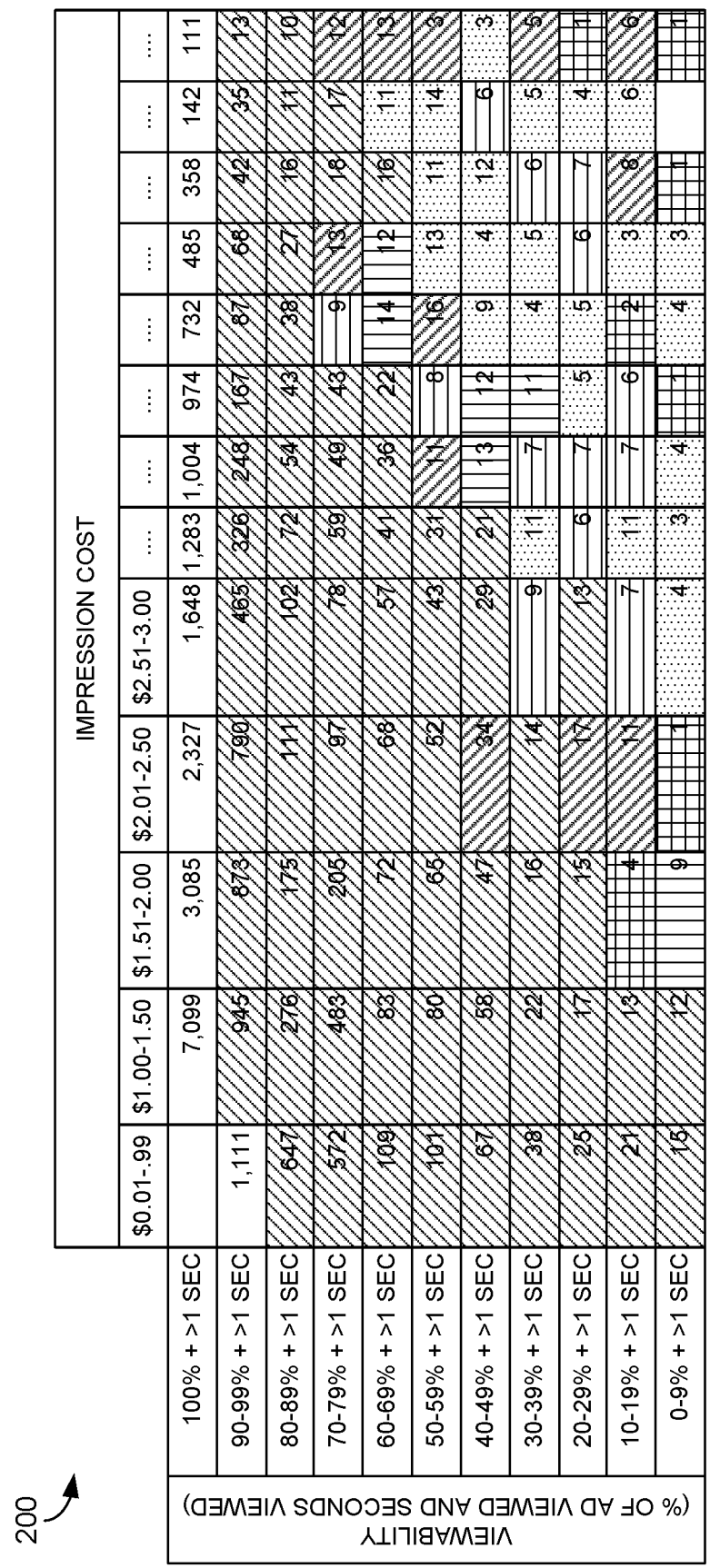

As an example to illustrate a cost-per-conversion user interface, FIG. 2 presents a heat map 200. The heat map 200 is a table in which each cell corresponds to a grouping based on a combination of a viewability range and a cost range. Each cell includes a visual indication to present a cost-per-conversion for the cell. For instance, in FIG. 2, each cell includes different cross-hatching to represent cost-per-conversion, but other visual indications (e.g., different coloring) could be employed to represent the cost-per-conversion for each cell. Each cell also includes an indication of the number of content impressions that qualify for that grouping. The visual indication of the cost-per-conversion illustrates different "hot spots" where cost-per-conversion is more favorable. The content impression count provides information regarding volume, which can be useful to identify cells at which the volume of content impressions is so small that it doesn't warrant operating at those viewability range/cost range associated with those cells. So, it could be concluded that a better decision would be to operate at a viewability range/cost range that is less cost-efficient, but the volume of content impressions represents a better opportunity to scale.

It should be understood that there are many possible representations of user interfaces that can be output to provide cost-per-conversion data for different viewability ranges. The heat map 200 of FIG. 2 is only one example. Additional examples are provided in FIGS. 3 and 4. In particular, FIG. 3 illustrates a user interface that includes a table 300 providing information for various viewability ranges 302. The information includes a conversion rate rank column 304, which reflects a rank based on conversion rate for each viewability range relative to other viewability ranges from best to worst. In this example, the cell ranked "1" corresponds with the 40-49 percent viewability range indicating that the best conversion rate is found when users are exposed to impressions at 40-49 percent viewability. The information also includes a cost rank column 306, which reflects a rank based on cost for each viewability range relative to other viewability ranges from best to worst. In this example, the cell ranked "9" corresponds with the 70-79 percent viewability range indicating that this particular viewability range is the ninth most costly to win content impressions for on the open exchange. A value of "1" in this column represents the least expensive cost for content impressions associated with zero viewability. Finally, the information includes a cost-per-conversion column 308, which provides the computed cost-per-conversion for several viewability ranges. This visual allows for a sliding scale comparison between cost and conversion rate. By adding impression volume or an indexed rank of impression volume that takes place at the various viewability levels, a decision of the optimal viewability definition can be made with scale considered.

Figure 4:
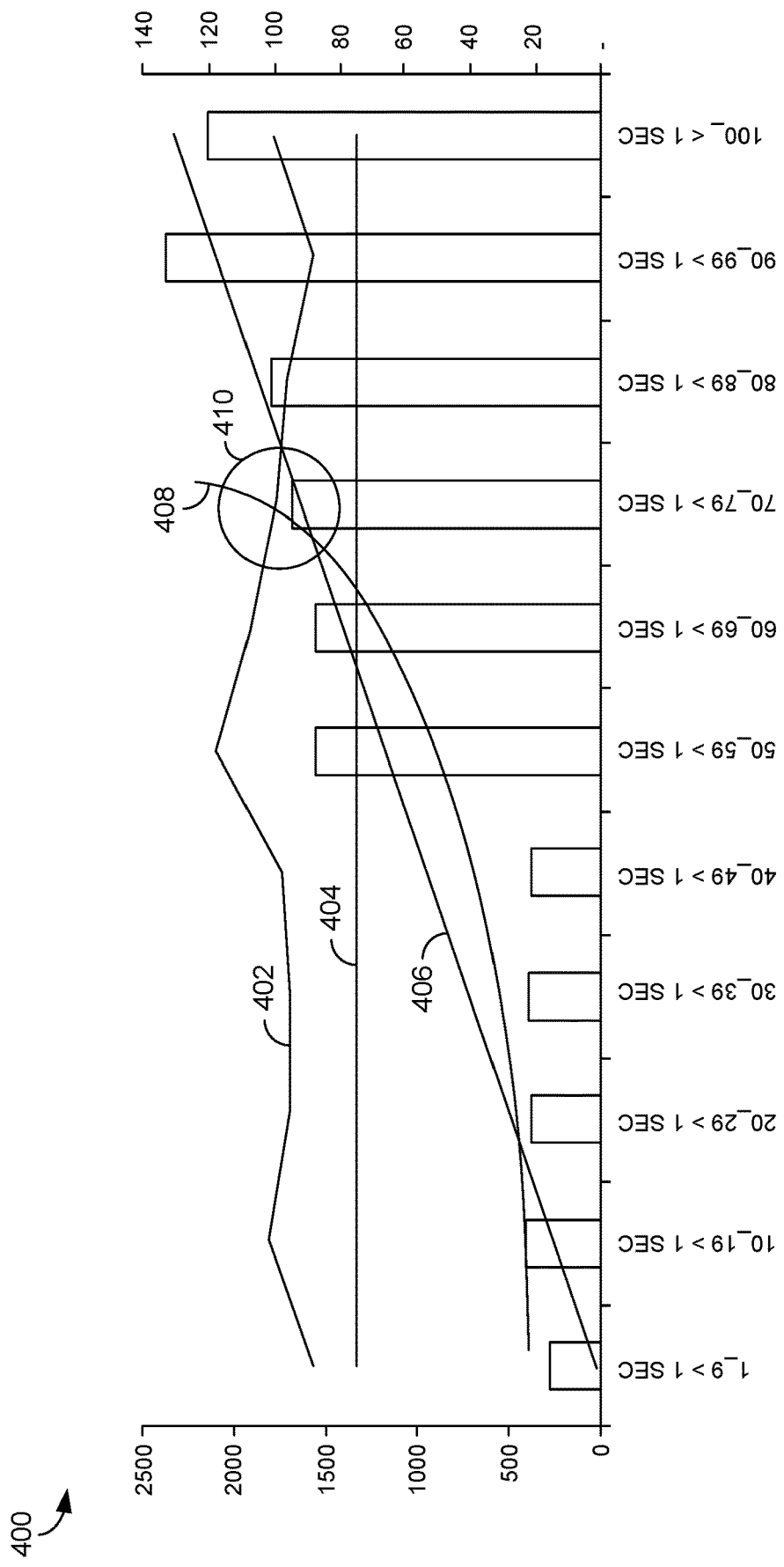

FIG. 4 illustrates a user interface 400 that includes a graph 400 providing a variety of information for different viewability ranges. As shown in FIG. 4, a bar is provided for each viewability range indicating a number of converters for each viewability range. Also included is a line 402, providing in-view conversion rate index that represents the unique user conversion rate or scored conversion rate of users exposed to content impressions at different viewability ranges relative to other viewability ranges. A line 404 provides an out-of-view conversation rate index that represents the unique user conversion rate or scored conversion rate of users exposed to content impressions that were measured as out-of-view or zero percent viewable. The intended outcome is to see that the conversion rate line 402 is always above the conversion rate line 404, which indicates that media has a positive effect on the addressable audience because any permutation of viewable content impressions contributes to conversions more than the zero percent viewable range, indicating a lift. A line 406 provides a linear trend line representation of converters across the viewability ranges. A line 408 provides an exaggerated cost curve of increasing cost as viewability of content impressions goes up to serve as an academic illustration of the supply and demand dynamics of digital media inventory on the open exchange. The intersection between the line 402 and line 408, as shown at 410, identifies an example of the most optimal spot a marketer might choose depending on their objectives before the increased cost is too much to warrant operating above that point.

Figure 1B:
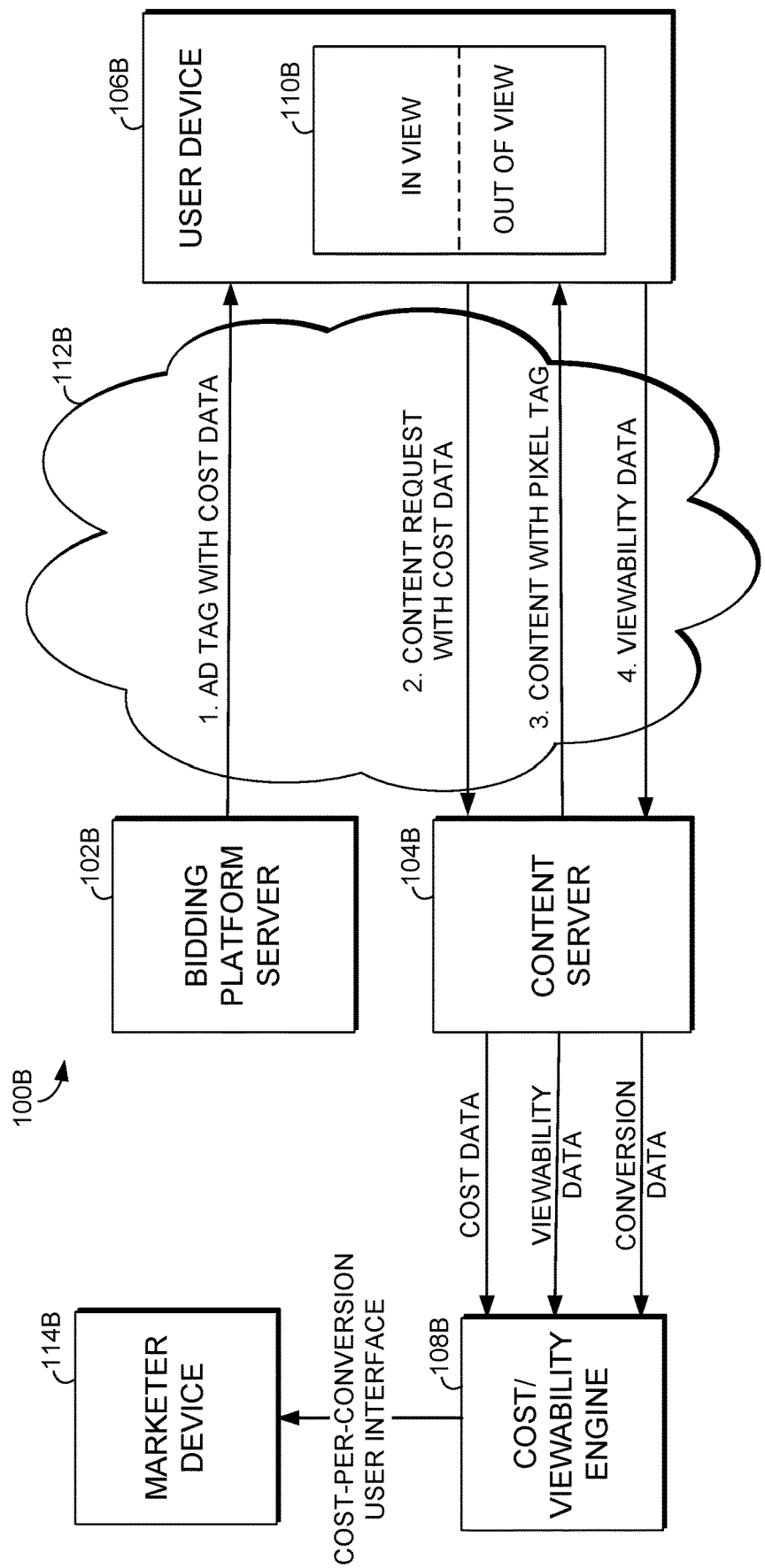

While the system in FIG. 1A illustrates a system in which content impression identifiers are provided via ad tags to a content server, in further embodiments, the cost for each impression can be provided to a content server via the ad tags. FIG. 1B provides a system 100B illustrating such embodiments. The system 100B is similar to the system 100A by including a bidding platform server 102B, content server 104B, user device 106B, and cost-viewability engine 108B. As shown in FIG. 1B, the bidding platform server 102B and the content server 104B can each communicate with the user device 106B via the network 112B, which may include, without limitation, one or more local area networks (LANs) and/or wide area networks (WANs). Such networking environments are commonplace in offices, enterprise-wide computer networks, intranets, and the Internet. It should be understood that any number of user devices and servers may be employed within the system 100B within the scope of the present invention. Each may comprise a single device or multiple devices cooperating in a distributed environment. Additionally, other components not shown may also be included within the network environment.

Similar to the discussion above for the system 100A, when the bidding platform server 102B wins a content impression on the user device 106B, the bidding platform server 102B provides an ad tag to the user device 106B. However, the ad tag in the current embodiment includes cost data for the content impression.

The ad tag acts as a redirect, causing the user device 106B to request content from the content server 104B. The request to the content server 104B includes the cost data for the content impression. When the content server 104B receives the request, the content server 104B stores the cost data in a content impression record for the content impression. Additionally, the content server 104B provides content with a pixel tag to the user device 106B. When rendered on the user device 106B with content 110B, the pixel tag causes impression data (including viewability data) to be returned to the content sever 104B. As previously discussed, the viewability data includes a value for each viewability attribute specified by the pixel tag. The content server 104B stores the viewability data in the content impression record for the content impression. As such, the cost data and viewability data for the content impression are correlated in the content impression record at the content sever 104B.

The cost/viewability engine 108B operates in a similar manner to the cost/viewability engine 108A to compute cost-per-conversion data and provide one or more cost-per-conversion user interfaces for display on a marketer device 114B to allow a marketer to review the data. The only difference is that the cost/viewability engine 108B can access the cost data and viewability data for content impressions from the content server 104B. Additionally, because the cost data and viewability data are already correlated for each content impression, the cost/viewability engine 108B doesn't need to perform such correlation as performed by the cost/viewability engine 108A.

While FIGS. 1A and 1B show a separate content server and bidding platform being used to collect cost data and viewability data, in further configurations, the cost data and viewability data may be obtained in other manners. For example, in some configurations, the bidding platform may be used to serve content instead of using a separate content server. In other words, the bidding platform would provide the functions of the content server as well as the functions of the bidding platform. In such configurations, the content impression data would all be stored in the bidding platform instead of a separate content server. Alternatively, marketers may choose to have the inventory owners providing content locations actually serve the content on their behalf instead of serving through a content server and/or bidding platform. In such configurations, the content impression data could be accessed from the inventory owners.

Figure 5:
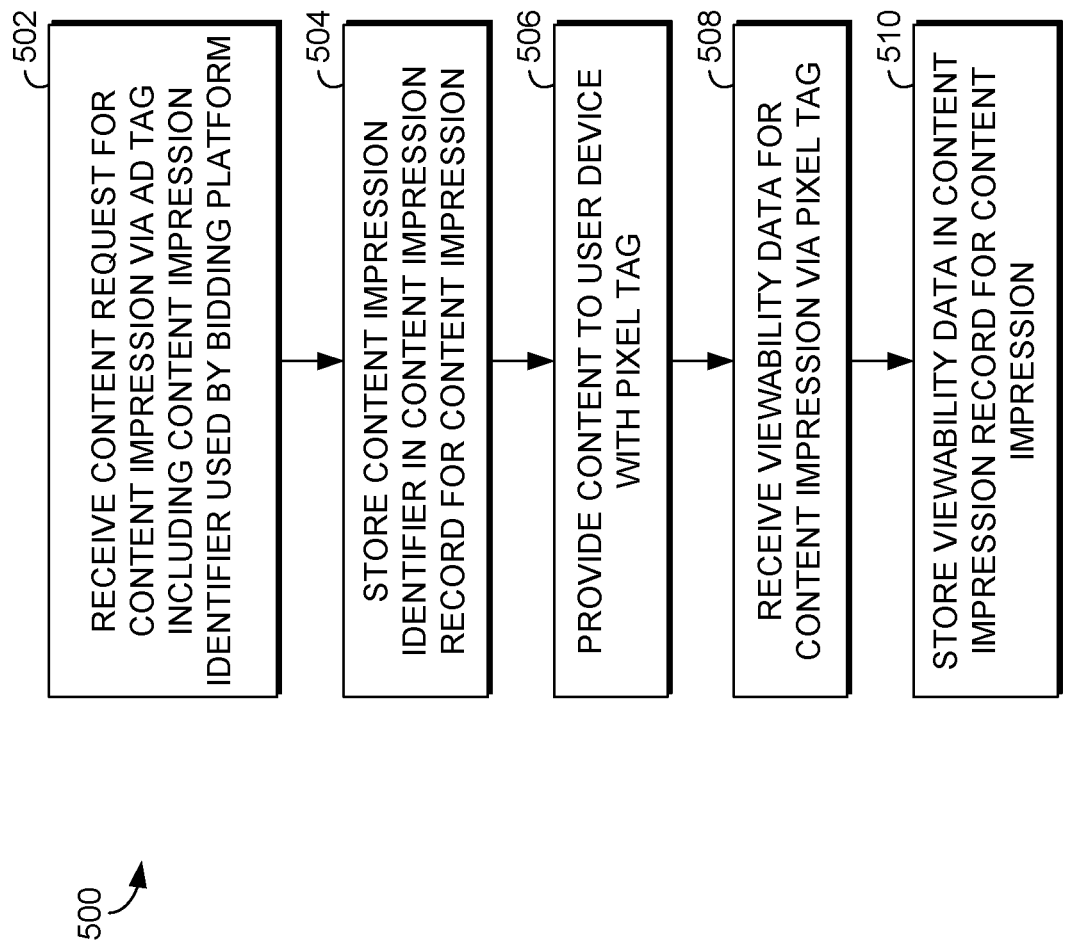
FIG. 5 is a flow diagram showing a method for a content server to correlate a content impression identifier from a bidding platform with viewability data for a content impression in accordance with some implementations of the present disclosure.

With reference now to FIG. 5, a flow diagram is provided illustrating a method 500 for a content server to correlate a content impression identifier from a bidding platform with viewability data for a content impression. Each block of the method 500 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (stand-alone or in combination with another hosted service), or a plug-in to another product, to name a few.

As shown at block 502, a request for content for a content impression on a user device is received at a content server via an ad tag. The ad tag originates from a bidding platform and is enhanced to include a content impression identifier used by the bidding platform to identify the content impression.

The content server stores the content impression identifier in a content impression record at the content server for the current content impression, as shown at block 504. Additionally, the content server provides content to the user device with a pixel tag, as shown at block 506. When the content is displayed on the user device, the pixel tag is launched, which causes impression data to be collected. Among other things, the collected impression data includes viewability data. The viewability data includes a value for each viewability attribute specified by the pixel tag. The value for each viewability attribute is either: (1) a length of time the content was displayed on a user device within the corresponding viewability range; or (2) whether the content was displayed on a user device within the corresponding viewability range for the threshold length of time set forth by the pixel tag.

The impression data (including the viewability data) for the content impression is received at the content server, as shown at block 508. The viewability data is stored in a content impression record for the content impression, as shown at block 510. The content impression record includes the content impression identifier from the bidding platform. This allows for cost data from the bidding platform to be correlated to the viewability data from the content server.

Figure 6:
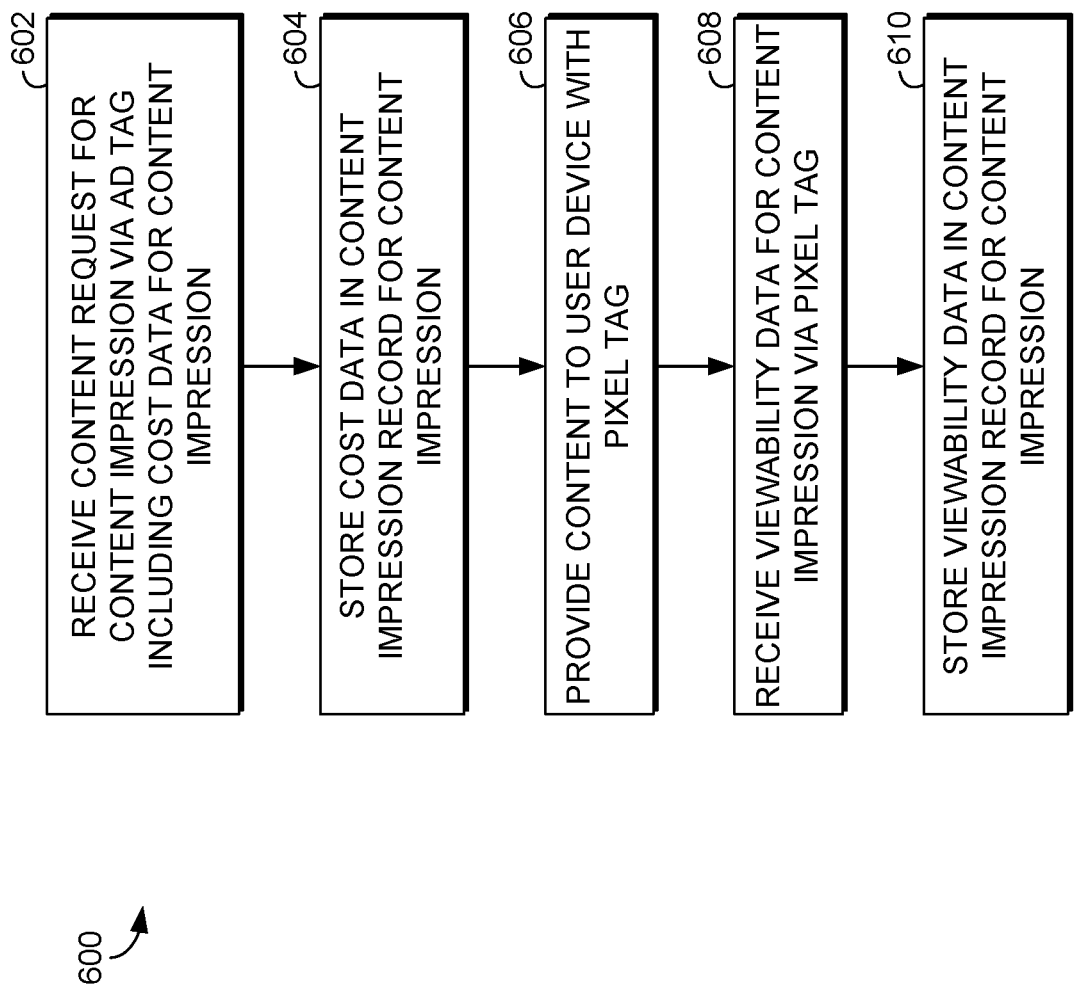
FIG. 6 is a flow diagram showing a method for a content server to correlate cost data from a bidding platform with viewability data for a content impression in accordance with some implementations of the present disclosure.

Turning now to FIG. 6, a flow diagram is provided that illustrates a method 600 for a content server to correlate cost data from a bidding platform with viewability data for a content impression. As shown at block 602, a request for content for a content impression on a user device is received at a content server via an ad tag. In the present configuration, instead of including a content impression identifier, the ad tag includes cost data for the content impression from a bidding platform.

The content server stores the cost data in a content impression record at the content server for the current content impression, as shown at block 604. Additionally, the content server provides content to the user device with a pixel tag, as shown at block 606. When the content is displayed on the user device, the pixel tag is launched, which causes impression data (including viewability data) to be collected. As previously noted, the viewability data includes a time value for each viewability attribute specified by the ad tag, each corresponding to a different viewability range.

The impression data (including the viewability data) for the content impression is received at the content server, as shown at block 608. The viewability data is stored in a content impression record for the content impression, as shown at block 610. The content impression record includes the cost data for the content impression from the bidding platform. This allows for cost data to be directly correlated to the viewability data for the content impression at the content server.

Figure 7:
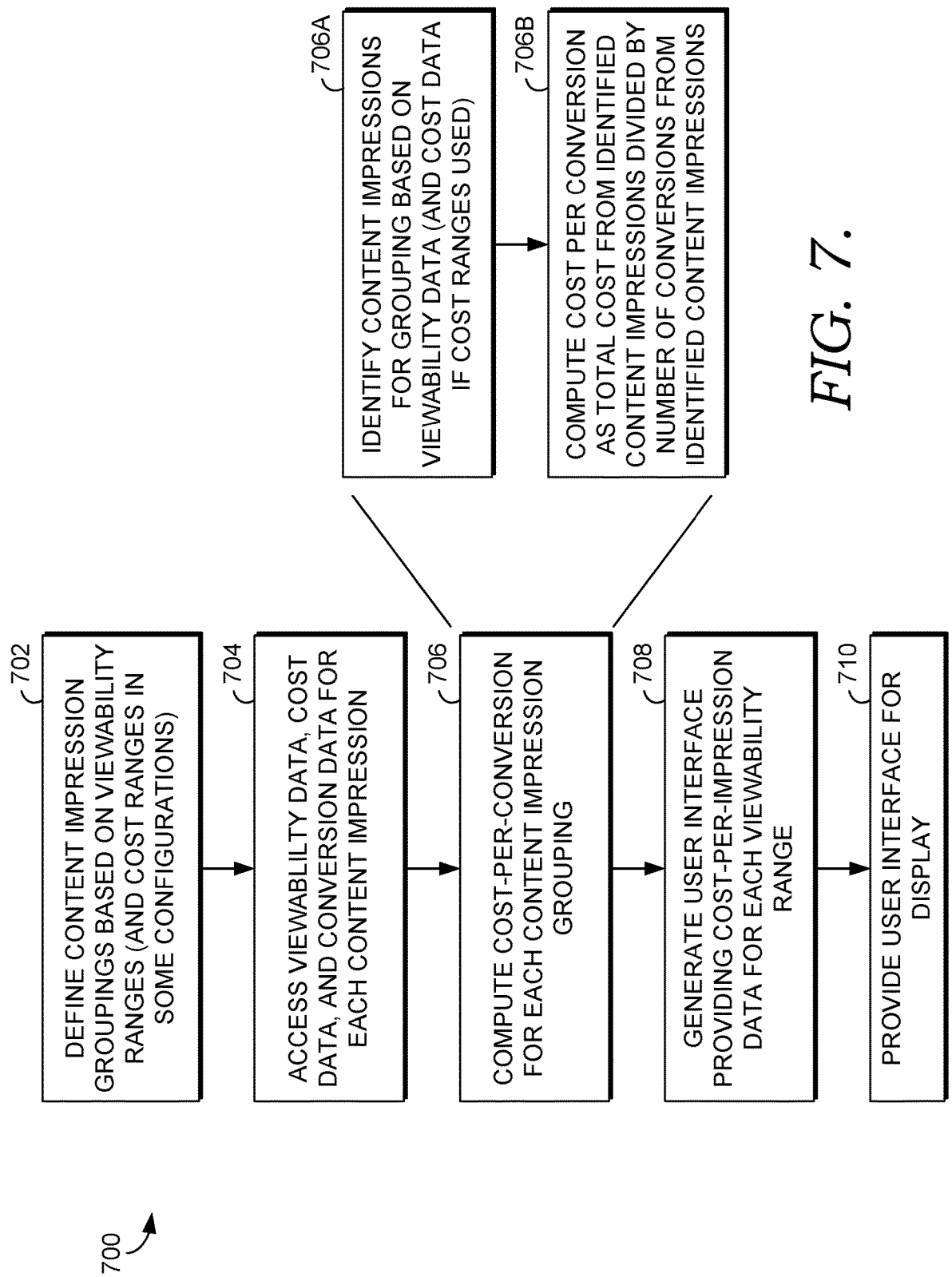
FIG. 7 is a flow diagram showing a method for determining cost-per-conversion data for different viewability ranges in accordance with some implementations of the present disclosure.

With reference next to FIG. 7, a flow diagram is provided that illustrates a method 700 for determining cost-per-conversion data for different viewability ranges. As shown at block 702, a number of groupings are defined based at least on viewability ranges with each grouping corresponding to a given viewability range and a required length of time content is displayed within the viewability range. In some configurations, the groupings are also based on cost ranges. In such configurations, each grouping corresponds to a combination of a viewability range and a cost range. The defined groupings allow for content impressions to be grouped based on the corresponding viewability ranges (and cost ranges, if used).

Viewability data, cost data, and conversion data for content impressions are accessed, as shown at block 704. The viewability data and cost data are on a per-content impression basis. In configurations in which an ad tag with a content impression identifier from a bidding platform is used, the viewability data is accessed from a content server and the cost data is accessed from the bidding platform. The viewability data and cost data for each content impression are correlated based on the content impression identifier used by the bidding platform. In configurations in which an ad tag with cost data is used, the viewability data and cost data are retrieved from the content server and may already be correlated.

A cost-per-conversion is computed for each grouping, as shown at block 706. For a given grouping, this includes identifying content impressions for the grouping based on viewability data and/or cost data associated with the content impressions, as shown at block 706A. The cost-per-conversion for the grouping is then computed at block 706B by dividing a total cost for the identified content impressions for the grouping by a number of conversions from the identified content impressions (or by multiplying the total cost by a conversion rate). The total cost could correspond to a sum of the actual costs for the identified content impressions. Alternatively, the total cost could be computed by multiplying the number of identified content impressions by a cost associated with a cost range for the grouping, if cost ranges are used (e.g., using a middle cost from the cost range).

A user interface is generated based on the cost-per-conversion information for the groupings, as shown at block 708. For instance, one of the user interfaces shown in FIGS. 2, 3, and 4 could be generated. The user interface is then provided for display, as shown at block 710.

Figure 8:
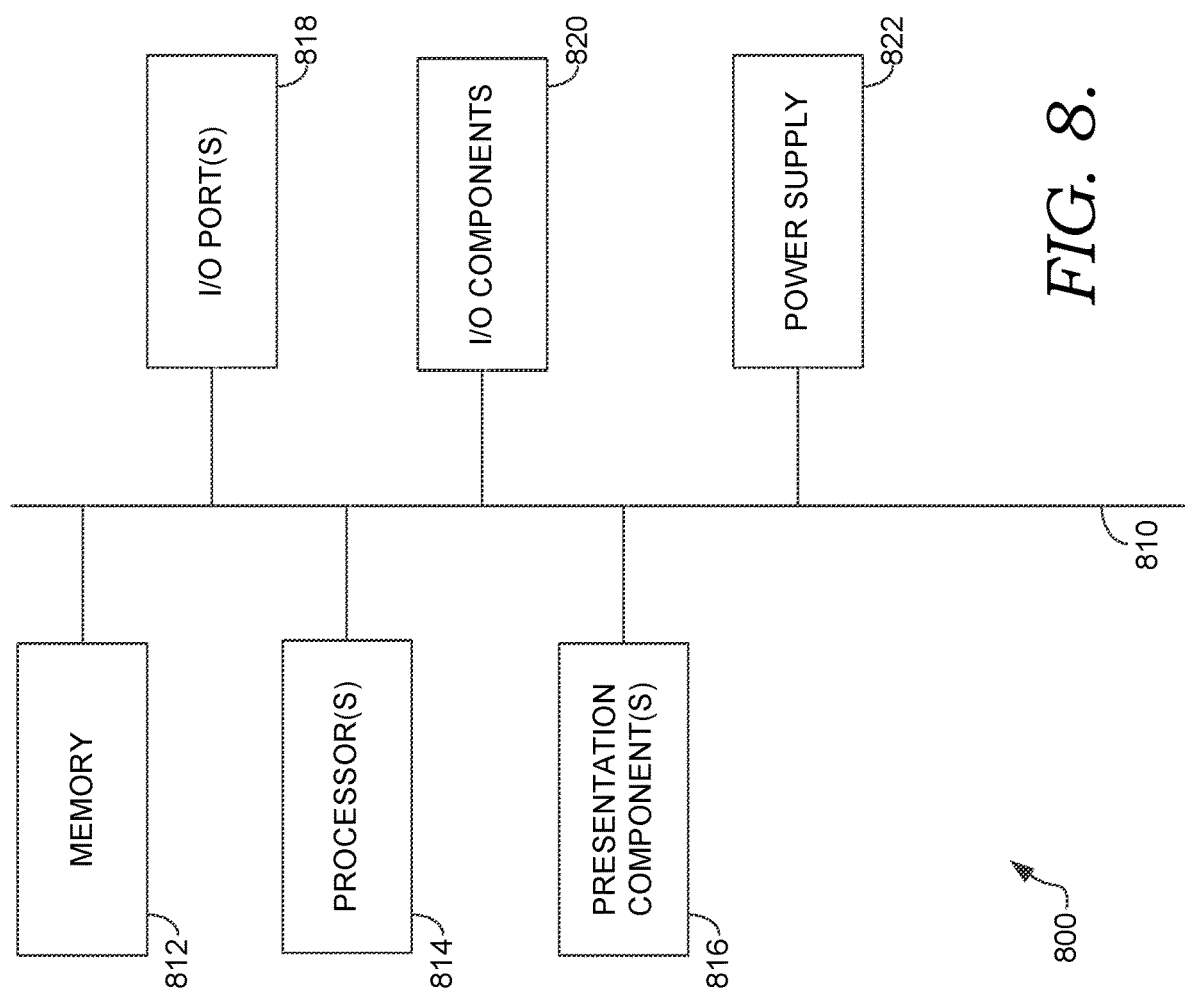
FIG. 8 is a block diagram of an exemplary computing environment suitable for use in implementations of the present disclosure.

Having described implementations of the present disclosure, an exemplary operating environment in which embodiments of the present invention may be implemented is described below in order to provide a general context for various aspects of the present disclosure. Referring initially to FIG. 8 in particular, an exemplary operating environment for implementing embodiments of the present invention is shown and designated generally as computing device 800. Computing device 800 is but one example of a suitable computing environment and is not intended to suggest any limitation as to the scope of use or functionality of the invention. Neither should the computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes bus 810 that directly or indirectly couples the following devices: memory 812, one or more processors 814, one or more presentation components 816, input/output (I/O) ports 818, input/output components 820, and illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 8 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc. The I/O components 820 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 800. The computing device 800 may be equipped with depth cameras, such as, stereoscopic camera systems, infrared camera systems, RGB camera systems, and combinations of these for gesture detection and recognition. Additionally, the computing device 800 may be equipped with accelerometers or gyroscopes that enable detection of motion.

As described above, implementations of the present disclosure relate to correlating cost data from a bidding platform to viewability data from a content server in order to provide cost-per-conversion for different viewability ranges. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method for generating a user interface providing cost-per-conversion for viewability ranges, the method comprising:

receiving, from a content server, cost data from a bidding platform for each content impression from a plurality of content impressions, the content server receiving the cost data for each content impression via a content request from a user device caused by an ad tag launched at the user device after the user device received the ad tag enhanced with the cost data from the bidding platform;

for each content impression from the plurality of content impressions, correlating, at a cost/viewability engine, the cost data from the bidding platform with viewability data from the content server, the viewability data for each content impression indicating a length of time that content associated with the content impression was viewable on a user device within each of a plurality of predefined viewability ranges, each predefined viewability range setting forth a corresponding percentage of an overall displayable area of content that is viewable on a display screen of a user device during a content impression;

assigning the content impressions to groupings at the cost/viewability engine based on the viewability data for each content impression, each grouping corresponding to one of the plurality of predefined viewability ranges;

computing a cost-per-conversion for each grouping at the cost/viewability engine using the cost data and conversion data for content impressions assigned to each grouping; and providing, by the cost/viewability engine, a user interface for display on a computing device that includes information regarding the cost-per-conversion for each grouping.

2. The method of claim 1, wherein assigning content impressions to a first grouping corresponding to a first viewability range comprises identifying each content impression having viewability data with a time value for a first predefined viewability range satisfying a required time value, the first predefined viewability range corresponding to the first viewability range.

3. The method of claim 1, wherein the groupings also correspond to cost ranges, each grouping corresponding to a combination of one of the predefined viewability ranges and one of the cost ranges.

4. The method of claim 3, wherein assigning content impressions to a first grouping corresponding to a first predefined viewability range and first cost range comprises identifying each content impression with viewability data satisfying the first predefined viewability range and cost data within the first cost range.

5. The method of claim 1, wherein computing the cost-per-conversion for a first grouping comprises dividing a total cost for content impressions assigned to the first grouping by a number of conversions from the content impressions assigned to the first grouping.

6. The method of claim 5, wherein the total cost for content impressions assigned to the first grouping comprises a sum of an actual cost of each content impression assigned to the first grouping.

7. The method of claim 5, wherein the total cost for content impressions assigned to the first grouping comprises a resulting value from multiplying a number of the content impressions assigned to the first grouping to a cost based on a cost range associated with the first content impression.

8. One or more computer storage media comprising computer-useable instructions, that when used by one or more computing devices, cause the one or more computing devices to perform operations, the operations comprising:

receiving, from a content server, cost data from a bidding platform for each content impression from a plurality of content impressions, the content server receiving the cost data for each content impression via a content request from a user device caused by an ad tag launched at the user device after the user device received the ad tag enhanced with the cost data from the bidding platform;

for each content impression from the plurality of content impressions, correlating, at a cost/viewability engine, the cost data from the bidding platform with viewability data from the content server, the viewability data for each content impression indicating a length of time that content associated with the content impression was viewable on a user device within each of a plurality of predefined viewability ranges, each predefined viewability range setting forth a corresponding percentage of an overall displayable area of content that is viewable on a display screen of a user device during a content impression;

assigning the content impressions to groupings at the cost/viewability engine based on the viewability data for each content impression, each grouping corresponding to one of the plurality of predefined viewability ranges;

computing a cost-per-conversion for each grouping at the cost/viewability engine using the cost data and conversion data for content impressions assigned to each grouping; and providing, by the cost/viewability engine, a user interface for display on a computing device that includes information regarding the cost-per-conversion for each grouping.

9. The one or more computer storage media of claim 8, wherein assigning content impressions to a first grouping corresponding to a first viewability range comprises identifying each content impression having viewability data with a time value for a first predefined viewability range satisfying a required time value, the first predefined viewability range corresponding to the first viewability range.

10. The one or more computer storage media of claim 8, wherein the groupings also correspond to cost ranges, each grouping corresponding to a combination of one of the predefined viewability ranges and one of the cost ranges.

11. The one or more computer storage media of claim 10, wherein assigning content impressions to a first grouping corresponding to a first predefined viewability range and first cost range comprises identifying each content impression with viewability data satisfying the first predefined viewability range and cost data within the first cost range.

12. The one or more computer storage media of claim 8, wherein computing the cost-per-conversion for a first grouping comprises dividing a total cost for content impressions assigned to the first grouping by a number of conversions from the content impressions assigned to the first grouping.

13. The one or more computer storage media of claim 12, wherein the total cost for content impressions assigned to the first grouping comprises a sum of an actual cost of each content impression assigned to the first grouping.

14. The one or more computer storage media of claim 12, wherein the total cost for content impressions assigned to the first grouping comprises a resulting value from multiplying a number of the content impressions assigned to the first grouping to a cost based on a cost range associated with the first content impression.

15. A system comprising:

one or more processors; and one or more computer storage media storing computer-useable instructions that, when used by the one or more processors, cause the one or more processors to:

receive, from a content server, cost data from a bidding platform for each content impression from a plurality of content impressions, the content server receiving the cost data for each content impression via a content request from a user device caused by an ad tag launched at the user device after the user device received the ad tag enhanced with the cost data from the bidding platform;

for each content impression from the plurality of content impressions, correlate, at a cost/viewability engine, the cost data from the bidding platform with viewability data from the content server, the viewability data for each content impression indicating a length of time that content associated with the content impression was viewable on a user device within each of a plurality of predefined viewability ranges, each predefined viewability range setting forth a corresponding percentage of an overall displayable area of content that is viewable on a display screen of a user device during a content impression;

assign the content impressions to groupings at the cost/viewability engine based on the viewability data for each content impression, each grouping corresponding to one of the plurality of predefined viewability ranges;

compute a cost-per-conversion for each grouping at the cost/viewability engine using the cost data and conversion data for content impressions assigned to each grouping; and provide, by the cost/viewability engine, a user interface for display on a computing device that includes information regarding the cost-per-conversion for each grouping.

16. The system of claim 15, wherein content impressions are assigned to a first grouping corresponding to a first viewability range by identifying each content impression having viewability data with a time value for a first predefined viewability range satisfying a required time value, the first predefined viewability range corresponding to the first viewability range.

17. The system of claim 15, wherein the groupings also correspond to cost ranges, each grouping corresponding to a combination of one of the predefined viewability ranges and one of the cost ranges.

18. The system of claim 17, wherein content impressions are assigned to a first grouping corresponding to a first predefined viewability range and first cost range by identifying each content impression with viewability data satisfying the first predefined viewability range and cost data within the first cost range.

19. The system of claim 15, wherein the cost-per-conversion is computed for a first grouping by dividing a total cost for content impressions assigned to the first grouping by a number of conversions from the content impressions assigned to the first grouping.

20. The system of claim 19, wherein the total cost for content impressions assigned to the first grouping comprises: a sum of an actual cost of each content impression assigned to the first grouping, or a resulting value from multiplying a number of the content impressions assigned to the first grouping to a cost based on a cost range associated with the first content impression.

* * * * *